(12) United States Patent
Xu et al.

(10) Patent No.: US 9,545,955 B2
(45) Date of Patent: Jan. 17, 2017

(54) FIXING METHOD OF WHEEL COVER

(71) Applicant: GM Global Technology Operations LLC, Detroit, MI (US)

(72) Inventors: Jie Xu, Shanghai (CN); Wenshui Wang, Shanghai (CN); Leon Guo, Shanghai (CN); Yantao You, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/470,048

(22) Filed: Aug. 27, 2014

(65) Prior Publication Data

US 2016/0059902 A1 Mar. 3, 2016

(51) Int. Cl.
*B65D 25/16* (2006.01)
*B62D 25/16* (2006.01)
*B62D 25/18* (2006.01)
*B62D 65/02* (2006.01)

(52) U.S. Cl.
CPC .......... *B62D 25/166* (2013.01); *B62D 25/186* (2013.01); *B62D 65/02* (2013.01); *B62D 25/16* (2013.01)

(58) Field of Classification Search
CPC ........................................ B62D 25/18–25/188
See application file for complete search history.

(56) References Cited

U.S. PATENT DOCUMENTS 2,352,464 A * 6/1944 Aerni .................. B62D 25/186
280/160

* cited by examiner

*Primary Examiner* — Erez Gurari
(74) *Attorney, Agent, or Firm* — BrooksGroup

(57) ABSTRACT

A number of variations may include a method comprising fixing a wheel cover on a wheel so that the wheel cover remains static as the wheel rotates on a horizontal axis and turns with the wheel as the wheel turns on a vertical axis comprising attaching a bearing system to a knuckle of a wheel; and attaching the wheel cover to the bearing system and the knuckle.

10 Claims, 4 Drawing Sheets

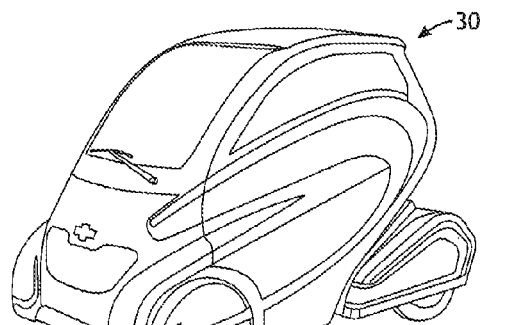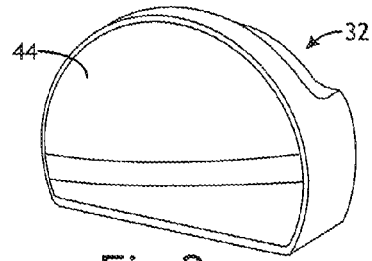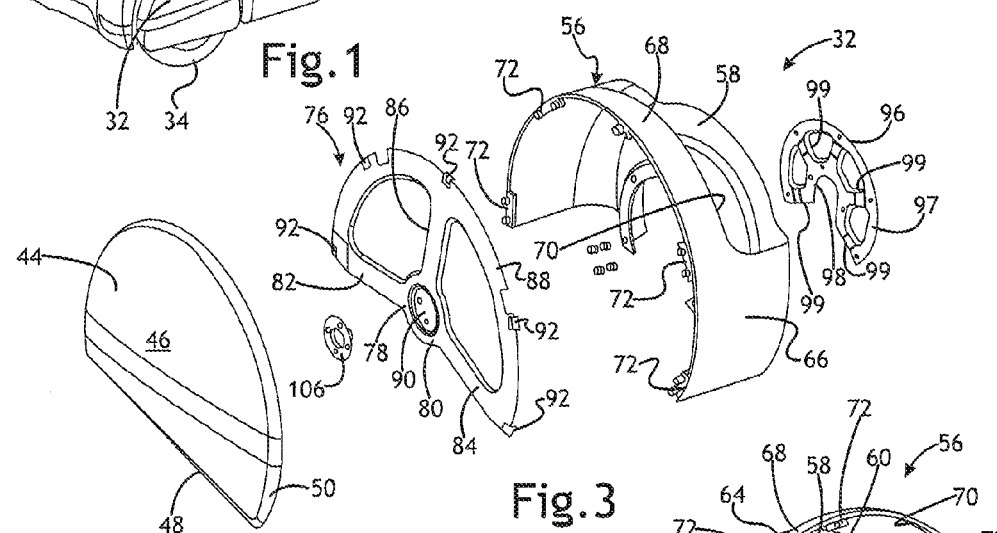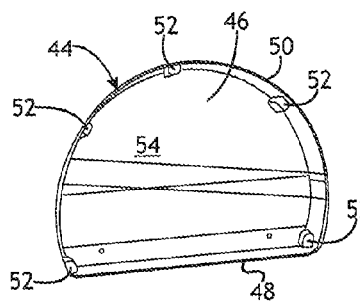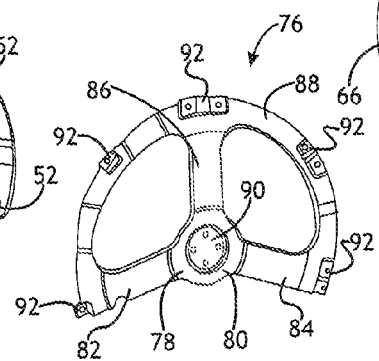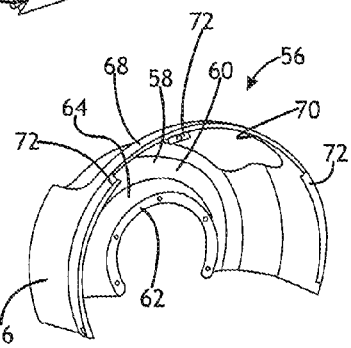

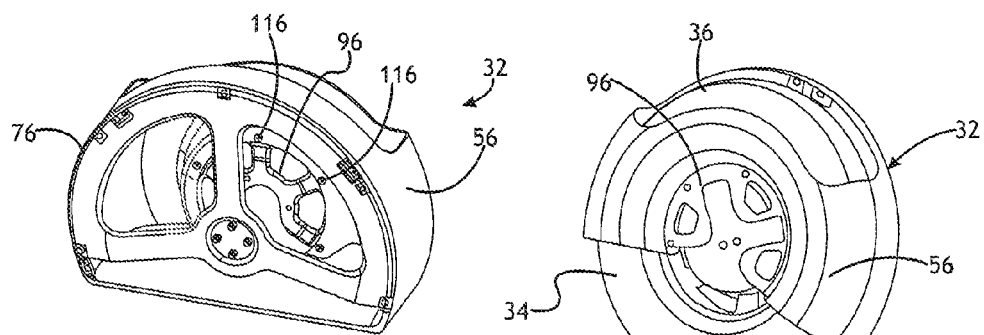
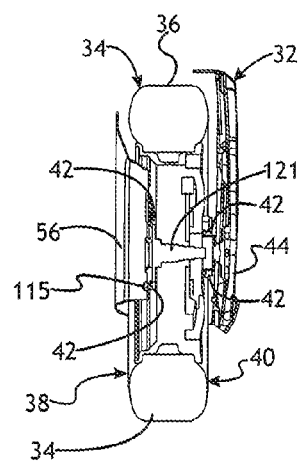
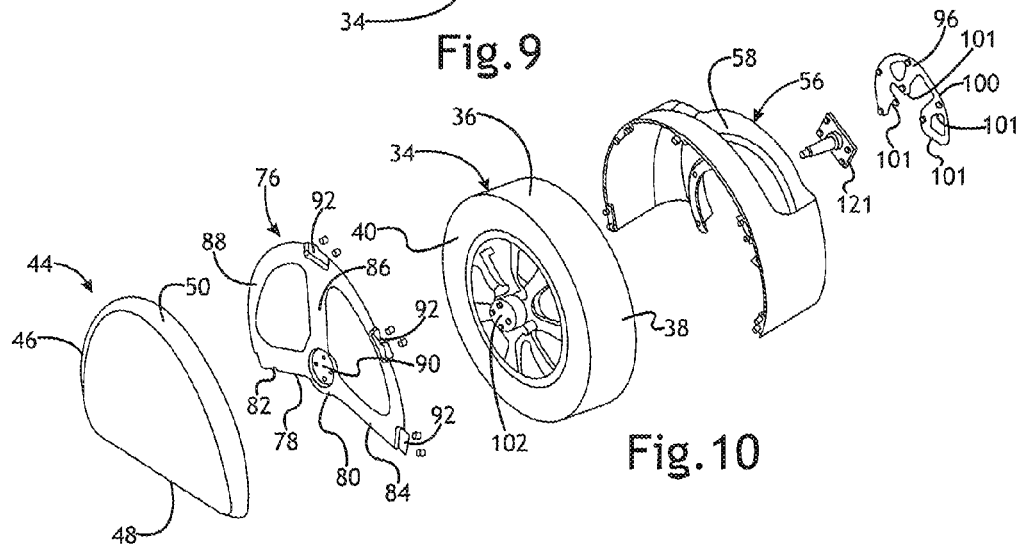

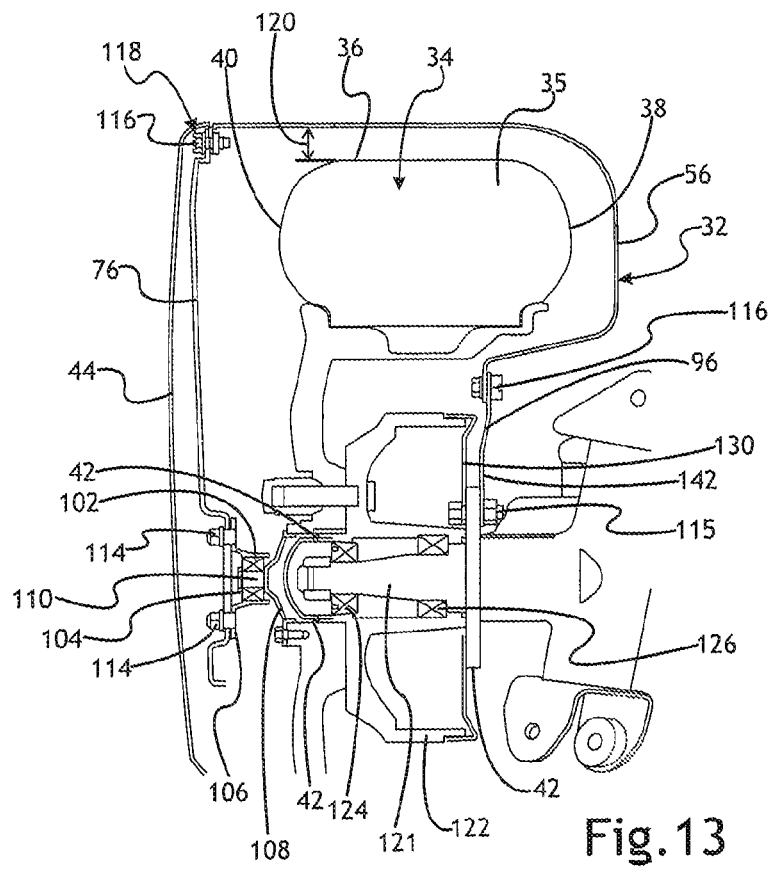
Fig. 13
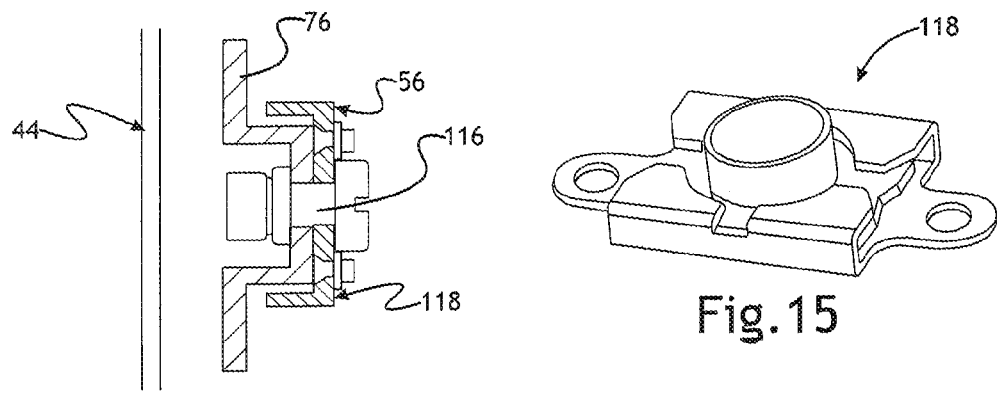
Fig. 14
Fig. 15

US 9,545,955 B2

FIXING METHOD OF WHEEL COVER

TECHNICAL FIELD

The field to which the disclosure generally relates to includes wheel covers.

BACKGROUND

A vehicle may include a wheel.

SUMMARY OF ILLUSTRATIVE VARIATIONS

One variation may include a method comprising fixing a wheel cover on a wheel so that the wheel cover remains static as the wheel rotates on a horizontal axis and turns with the wheel as the wheel turns on a vertical axis comprising attaching a bearing system to a knuckle of a wheel and attaching the wheel cover to the bearing system and the knuckle.

Another variation may include a fixing method of a wheel cover to a wheel comprising: providing a bearing system comprising a wheel holder, a bearing operatively connected to the wheel holder, and an outer cover bracket attached to the bearing; attaching the wheel holder to a wheel; and attaching a wheel cover to the bearing system and the wheel.

Another variation may include a product comprising a wheel cover comprising: an outer cover; an inner cover; an inner ring, wherein the outer cover and the inner cover are attached to the inner ring; and an inner cover bracket, wherein the inner cover bracket is attached to the inner cover.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a perspective view of a vehicle according to a number of variations.

FIG. 2 illustrates a perspective view of a wheel cover according to a number of variations.

FIG. 3 illustrates an exploded view of a wheel cover according to a number of variations.

FIG. 4 illustrates a rear perspective view of an outer cover according to a number of variations.

FIG. 5 illustrates a front perspective view of an inner ring according to a number of variations.

FIG. 6 illustrates a front perspective view of an inner cover according to a number of variations.

FIG. 7 illustrates a perspective sectional view of a wheel cover according to a number of variations.

FIG. 8 illustrates a perspective rear view of a wheel cover attached to a wheel according to a number of variations.

FIG. 9 illustrates a perspective side view of a wheel cover attached to a wheel according to a number of variations.

FIG. 10 illustrates an exploded view of a wheel cover and wheel according to a number of variations.

FIG. 13 illustrates a sectional view of a wheel cover attached to a wheel according to a number of variations.

FIG. 14 illustrates a close-up sectional view of an inner cover and inner ring attachment according to a number of variations.

FIG. 15 illustrates a mechanical fastener according to a number of variations.

DETAILED DESCRIPTION OF ILLUSTRATIVE VARIATIONS

Figure 11:
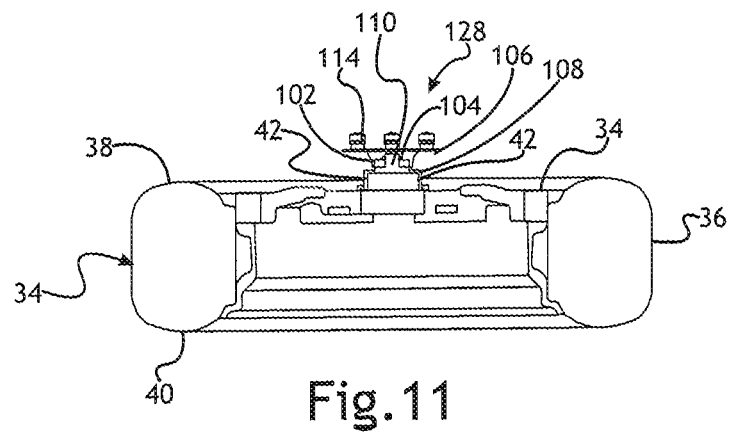
FIG. 11 illustrates a sectional view of a bearing system attached to a wheel according to a number of variations.

The following description of the variations is merely illustrative in nature and is in no way intended to limit the scope of the invention, its application, or uses.

FIGS. 1 and 2 illustrate a number of variations. In one variation, a vehicle 30 including, but not limited to, an electric vehicle may include one or more wheel covers 32 which may cover at least a portion of a vehicle wheel 34 including, but not limited to, a front wheel. In a number of variations, a wheel cover 32 may be attached to the wheel 34 and may act as an additional trim component which may cover at least a portion of the wheel 34. The wheel cover 32 may be attached to the wheel 34 so that as the wheel 34 rotates on a horizontal axis while the vehicle 30 is driven, the wheel cover 32 may not rotate on a horizontal axis with the wheel 34 and so that the wheel cover 32 may turn with the direction of the wheel 34 on a vertical axis as the vehicle 30 is steered left and right. The wheel cover 32 may be constructed and arranged to protect the wheel 34 from contaminants and may also be used for aesthetic purposes. The wheel cover 32 may also improve the power efficiency of the vehicle by creating better air flow.

In a number of variations, a wheel cover 32 may comprise an outer cover 44, an inner ring 76, an inner cover 56, and an inner cover bracket 96. In a number of variations, the outer cover 44 may be constructed and arranged to cover a portion of an outer side surface 40 of the wheel 34, a variation of which is illustrated in FIG. 9. The outer cover 44 may comprise a body 46 which may be circular with a flat bottom 48, variations of which are illustrated in FIGS. 3, 4, and 10. The outer cover 44 may be constructed and arranged to attach to at least one of the inner cover 56 or the inner ring 76. In one variation, the body 46 may also include a lip 50 which may extend outward from the perimeter of the body 46, a variation of which is illustrated in FIG. 4. The body 46 may also include one or more attachment features 52, variations of which are also illustrated in FIG. 4, which may be used to attach the outer cover 44 to the inner ring 76, as will be discussed hereafter. The outer cover 44 may comprise any number of materials including, but not limited to, carbon fiber which may decrease the weight of the outer cover 44 and which may increase the stiffness and/or strength of the outer cover 44. In another variation, the outer cover 44 may comprise steel or a polymer.

In a number of variations, the inner cover 56 may be constructed and arranged to cover a portion of the perimeter or tread 36 of the tire 35 of the wheel 34 as well as an inner side 38 of the wheel 34, variations of which are illustrated in FIGS. 8 and 9. The inner cover 56 may include a body portion 58 which may be a half ring shape, variations of which are illustrated in FIGS. 3, 6, and 10. The body portion 58 may include a first surface 60, a second surface 62, and ramp surface 64 which may extend between the first and second surfaces 60, 62. A wall 66 may extend at a curved angle inward from the outer perimeter of the first surface 60 and may be constructed and arranged to cover a portion of the perimeter or tread 36 of the tire 35 and a portion of the inner side 38 of the wheel 34. A portion of the top 68 of the wall 66 may include a cutout 70, variations of which are illustrated in FIGS. 3 and 6. The cutout portion 70 may be constructed and arranged for installation space requirements, reducing the weight and material of the inner cover 56, and/or to generate enough clearance between the inner cover 56 and the chassis frame which may allow for cooling of the brake. The inner cover 56 may also include one or more attachment features 72 which may be used to attach the inner cover 56 to the inner ring 76, as will be discussed hereafter. The inner cover 56 may comprise any number of materials including, but not limited to, carbon fiber, steel, or a polymer.

In a number of variations, the inner ring 76 may comprise a body 78 which may be semi-circular in shape, variations of which are illustrated in FIGS. 3, 5, and 10. The body 76 may include a circular portion 80 and may include a first arm 82 which may extend horizontally outward from the circular portion 80 and a second arm 84 which may extend horizontally outward from the circular portion 80 in a direction opposite of the first arm 82. A third arm 86 may extend vertically upward from the circular portion 80. An outer ring portion 88 may connect the first, second, and third arms 82, 84, 86 together so that the inner ring 76 may be a single continuous component. The circular portion 80 may also include a protrusion 90 which may be circular in shape and may be constructed and arranged to attach to the outer cover bracket 106, as will be discussed hereafter. The inner ring 76 may also include one or more attachment features 92 which may be used to attach the inner ring 76 to at least one of the inner cover 56 and/or the outer cover 44, as will be discussed hereafter. The inner ring 76 may comprise any number of materials including, but not limited to, carbon fiber or steel.

In a number of variations, the outer cover 44 and the inner cover 56 may each be attached to the inner ring 76, a variation of which is illustrated in FIG. 7. In one variation, the inner ring 76, outer cover 44, and inner cover 56 may be attached together via one or more attachment features 52, 72, 92, variations of which are illustrated in FIGS. 4-7. The inner ring 76 attachment feature 92 may comprise one or more grooves or indentations which may mate with one or more attachment features 52 on the outer cover 44 which may comprise one or more protrusions which may extend from an inner surface 54 of the outer cover 44. The inner cover 56 attachment features 72 may include one or more tabs which may align with the one or more grooves 92 on the inner ring 76. The inner ring 76, outer cover 44, and inner cover 56 may be pre-attached at the attachment features 52, 72, 92 during assembly using an adhesive including, but not limited to, resin. The inner cover 56 may then be secured to the inner ring 76 via one or more mechanical fasteners 118 including, but not limited to, a cage nut which may include a bolt 116 and one or more rivets which may extend through the cage nut, variations of which are illustrated in FIGS. 14 and 15.

In a number of variations, the inner cover bracket 96 may be constructed and arranged to attach to the inner cover 56 as well as the spindle 121 which may be attached to the knuckle (circular hole) 42 of the wheel 34, variations of which are illustrated in FIGS. 7 and 13. In one variation, the inner cover bracket 96 may comprise an outer partial ring-like portion 97 and an inner partial ring-like portion 98 and may include one or more arms 99 which may extend therebetween, a variation of which is illustrated in FIG. 3. In another variation, an inner cover bracket 96 may comprise a partial ring-like section 100 which may include one or more sets of arms 101 which may extend at opposite angles toward each other, a variation of which is illustrated in FIG. 10. The inner cover bracket 96 may comprise any number of materials including, but not limited to, steel. The inner cover bracket 96 may be attached to the inner cover 56 in any number of variations including, but not limited to, one or more mechanical fasteners 116, a variation of which is illustrated in FIG. 7.

FIGS. 11-15 illustrate a number of variations. In one variation, the wheel cover 32 may be attached to the wheel 34 using a bearing system 128 so that as the wheel 34 rotates on a horizontal axis within the wheel cover 32, a bearing 102 may allow the wheel cover 32 to remain stationary so that it may not rotate on a horizontal axis with the wheel 34 as the vehicle 30 is driven and so that the wheel cover 32 may rotate on a vertical axis with the direction of the wheel 34 so that it may turn left and right with the wheel 34 as the vehicle 30 is steered.

In a number of variations, the wheel 34 may include a spindle 121 which may be connected to the knuckle 42 of the wheel 34, a variation of which is illustrated in FIG. 13. A brake drum 122 may be fitted to the spindle 121. The brake drum 122 may comprise a first and a second bearing 124, 126 including, but not limited to, single row tapered roller bearings. The inner cover bracket 96 may be attached to the spindle 121 which may be attached to the backing plate 130 of the brake drum 122. The inner cover bracket 96, spindle 121, and backing plate 130 may be attached in any number of variations including, but not limited to, one or more mechanical fasteners 115, a variation of which is illustrated in FIG. 13.

Figure 12:
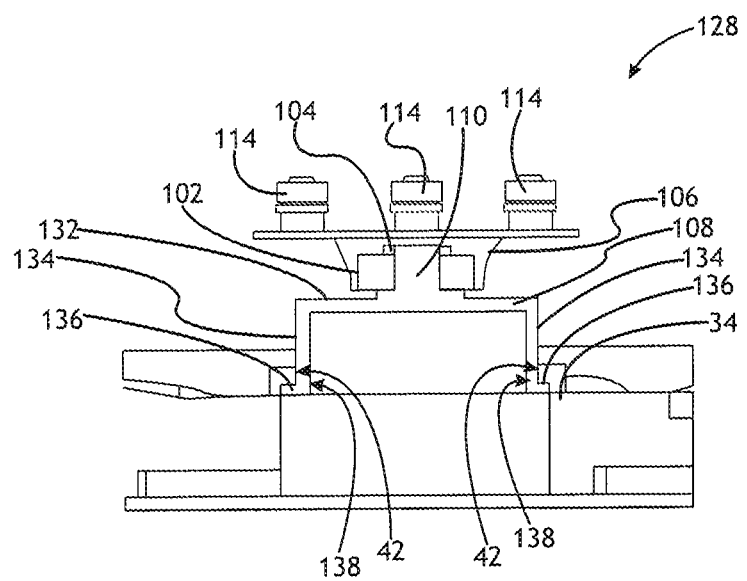
FIG. 12 illustrates a close up sectional view of a bearing system attached to a wheel according to a number of variations.

In a number of variations, the bearing system 128 may comprise a wheel holder 108 which may be attached to the wheel 34 and may be constructed and arranged to rotate on a horizontal axis with the wheel 34, variations of which are illustrated in FIGS. 11 and 12. In a number of variations, the wheel holder 108 may include a top surface 132 and a cylindrical wall 134 which may extend downward from the top surface 132, a variation of which is illustrated in FIG. 12. The top surface 132 may comprise a spindle 110 which may extend upward from the top surface 132. The wheel holder 108 may also include a flange or lip 136 which may extend outward from the bottom end 138 of the cylindrical wall 134, a variation of which is also illustrated in FIG. 12. The flange or lip 136 may be constructed and arranged to hold the wheel holder 108 within the circular hole 42 of the wheel 34 which may prevent the wheel holder 108 from disengaging from the circular hole 42 of the wheel 34. The wheel holder 108 may be attached to the wheel 34 in any number of variations including, but not limited to, an interference fit with the circular hole or knuckle 42 of the wheel 34. In another variation, one or more mechanical fasteners may also be used to further attach the wheel holder 108 to the wheel 34. A bearing 102 may be used to connect the wheel holder 108 to an outer cover bracket 106 which may allow the wheel holder 108 to rotate on a horizontal axis with the wheel while allowing the outer cover bracket 106 to remain static when attached to the outer cover 44. A circlip 104 may lock the bearing 102 in place which may optimize the performance of the bearing 102 by preventing the bearing 102 from moving within the wheel holder 108. The circlip 104 may also reduce or prevent vibrating of the wheel cover system. In a number of variations, the inner ring 76 may be attached to the outer cover bracket 106, a variation of which is illustrated in FIG. 13. In one variation, one or more mechanical fasteners 114 may be used to attach the outer cover bracket 106 and the inner ring 76.

In a number of variations, the wheel cover 32 may also be constructed and arranged to provide a clearance 120 between the tread 36 of the tire 35 and the wheel cover 32, a variation of which is illustrated in FIG. 13.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method comprising: fixing a wheel cover on a wheel so that the wheel cover remains static as the wheel rotates on a horizontal axis and turns with the wheel as the wheel turns on a vertical axis comprising: attaching a bearing system to a knuckle of a wheel; and attaching the wheel cover to the bearing system and the knuckle.

Variation 2 may include a method as set forth in Variation 1 wherein the bearing system comprises a wheel holder, a bearing operatively connected to the wheel holder, and an outer cover bracket attached to the bearing, and wherein the wheel cover is attached to a spindle attached to the knuckle and the outer cover bracket.

Variation 3 may include a method as set forth in any of Variations 1-2 wherein a circlip locks the bearing in place.

Variation 4 may include a method as set forth in any of Variations 1-3 wherein the wheel cover comprises an outer cover, an inner cover, an inner ring disposed within the outer cover and the inner cover, and an inner cover bracket attached to the inner cover, and wherein the inner ring is attached to the outer cover bracket and the inner cover bracket is attached to the spindle.

Variation 5 may include a fixing method of a wheel cover to a wheel comprising: providing a bearing system comprising a wheel holder, a bearing operatively connected to the wheel holder, and an outer cover bracket attached to the bearing; attaching the wheel holder to a wheel; and attaching a wheel cover to the bearing system and the wheel.

Variation 6 may include a method as set forth in Variation 5 wherein a circlip is attached to the bearing.

Variation 7 may include a method as set forth in any of Variations 5-6 wherein the wheel holder further comprises a spindle.

Variation 8 may include a method as set forth in any of Variations 5-7 wherein the wheel cover is static as the wheel rotates on a horizontal axis and turns on a vertical axis with the direction of the wheel.

Variation 9 may include a method as set forth in any of Variations 5-8 wherein the wheel cover is constructed and arranged to include a clearance between the tire and the outer cover.

Variation 10 may include a product comprising: a wheel cover comprising: an outer cover; an inner cover; an inner ring, wherein the outer cover and the inner cover are attached to the inner ring; and an inner cover bracket, wherein the inner cover bracket is attached to the inner cover.

Variation 11 may include a product as set forth in Variation 10 wherein the wheel cover is attached to a wheel.

Variation 12 may include a product as set forth in Variation 10 wherein the wheel further comprises a bearing system, wherein the bearing system comprises a wheel holder, a bearing operatively connected to the wheel holder, and an outer cover bracket attached to the bearing, and wherein the inner cover bracket is attached to the wheel and the inner ring is attached to the outer cover bracket.

Variation 13 may include a product as set forth in any of Variations 10-12 further comprising a circlip, wherein the circlip locks the bearing in place.

Variation 14 may include a product as set forth in any of Variations 10-13 wherein the inner cover comprises a body portion comprising a first surface, a second surface, and a ramp surface which extends between the first and the second surface; a wall which extends at a curved angle inward from an outer perimeter of the first surface and which is constructed and arranged to cover a portion of the perimeter and a portion of a side surface of the wheel; and wherein a cutout is located in a top portion of the wall.

Variation 15 may include a product as set forth in any of Variations 10-14 wherein the outer cover comprises a body, wherein the body is circular in shape with a flat bottom edge, and wherein the body includes a lip which extends outward from the perimeter of the body and is constructed and arranged to attach to the inner ring.

Variation 16 may include a product as set forth in any of Variations 10-15 wherein the inner ring comprises a body which includes a circular portion, a first arm extending horizontally in a first direction from the circular portion and a second arm extending horizontally in a second direction from the circular portion, a third arm extending vertically upward from the circular portion, and an outer ring portion which connects the first, the second, and the third arms together.

Variation 17 may include a product as set forth in any of Variations 10-16 wherein the inner cover, the outer cover, and the inner ring comprise a carbon fiber.

Variation 18 may include a product as set forth in any of Variations 11-17 wherein the wheel is attached to a vehicle and wherein the wheel cover is static as the wheel rotates on a horizontal axis and turns on a vertical axis with the direction of the wheel.

Variation 19 may include a product as set forth in any of Variations 10-18 wherein the wheel cover is constructed and arranged to protect a wheel from contaminants.

Variation 20 may include a product as set forth in any of Variations 11-19 wherein there is a clearance between a top of the wheel and the wheel cover.

The above description of select variations within the scope of the invention is merely illustrative in nature and, thus, variations or variants thereof are not to be regarded as a departure from the spirit and scope of the invention.

What is claimed is:
1. A product comprising:
   a wheel cover comprising:
   an outer cover;
   an inner cover;
   an inner ring, wherein the outer cover and the inner cover are attached to the inner ring; and
   an inner cover bracket, wherein the inner cover bracket is attached to the inner cover;
   wherein the wheel cover further comprises a bearing system, wherein the bearing system comprises a wheel holder, a bearing operatively connected to the wheel holder, and an outer cover bracket attached to the bearing, and wherein the inner cover bracket is attached to the wheel and the inner ring is attached to the outer cover bracket.

2. The product of claim 1 wherein the wheel cover is attached to a wheel.

3. The product of claim 1 further comprising a circlip, wherein the circlip locks the bearing in place.

4. The product of claim 1 wherein the inner cover, the outer cover, and the inner ring comprise a carbon fiber.

5. The product of claim 2 wherein the wheel is attached to a vehicle and wherein the wheel cover is static as the wheel rotates on a horizontal axis and turns on a vertical axis with the direction of the wheel.

6. The product of claim 1 wherein the wheel cover is constructed and arranged to protect a wheel from contaminants.

7. The product of claim 2 wherein there is a clearance between a top of the wheel and the wheel cover.

8. A product comprising:
a wheel cover comprising:
an outer cover;
an inner cover;
an inner ring, wherein the outer cover and the inner cover are attached to the inner ring; and an inner cover bracket, wherein the inner cover bracket is attached to the inner cover, wherein the inner cover comprises a body portion comprising a first surface, a second surface, and a ramp surface which extends between the first and the second surface; a wall which extends at a curved angle inward from an outer perimeter of the first surface and which is constructed and arranged to cover a portion of the perimeter and a portion of a side surface of the wheel; and wherein a cutout is located in a top portion of the wall.

9. A product comprising:
a wheel cover comprising:
an outer cover;
an inner cover;
an inner ring, wherein the outer cover and the inner cover are attached to the inner ring; and an inner cover bracket, wherein the inner cover bracket is attached to the inner cover, wherein the outer cover comprises a body, wherein the body is circular in shape with a flat bottom edge, and wherein the body includes a lip which extends outward from the perimeter of the body and is constructed and arranged to attach to the inner ring.

10. A product comprising:
a wheel cover comprising:
an outer cover;
an inner cover;
an inner ring, wherein the outer cover and the inner cover are attached to the inner ring; and an inner cover bracket, wherein the inner cover bracket is attached to the inner cover, wherein the inner ring comprises a body which includes a circular portion, a first arm extending horizontally in a first direction from the circular portion and a second arm extending horizontally in a second direction from the circular portion, a third arm extending vertically upward from the circular portion, and an outer ring portion which connects the first, the second, and the third arms together.

* * * * *